(12) United States Patent
Neumair et al.

(10) Patent No.: US 10,851,909 B2
(45) Date of Patent: Dec. 1, 2020

(54) DUAL-STAGE PUMP WITH SWITCHING VALVE

(71) Applicant: HAWE Hydraulik SE, Munich (DE)

(72) Inventors: Georg Neumair, Thalhausen (DE); Thomas Simon, Freising (DE)

(73) Assignee: HAWE Hydraulik SE, Munich (DE)

( * ) Notice: Subject to any disclaimer, the term of this patent is extended or adjusted under 35 U.S.C. 154(b) by 362 days.

(21) Appl. No.: 15/864,684

(22) Filed: Jan. 8, 2018

(65) Prior Publication Data

US 2018/0195510 A1 Jul. 12, 2018

(30) Foreign Application Priority Data

Jan. 9, 2017 (DE) .......................... 10 2017 200 212

(51) Int. Cl.
*F16K 31/122* (2006.01)
*F04B 23/02* (2006.01)
(Continued)

(52) U.S. Cl.
CPC ........ *F16K 31/1221* (2013.01); *F04B 23/025* (2013.01); *F04B 23/06* (2013.01);
(Continued)

(58) Field of Classification Search
CPC .... F04B 53/101; F04B 53/16; F04B 53/1087; F04B 53/14; F04B 23/06; F04B 23/025; F04B 3/00; F16K 15/044; F16K 31/1221
See application file for complete search history.

(56) References Cited

U.S. PATENT DOCUMENTS 3,574,314 A * 4/1971 Quercia .................... F23Q 2/52
141/349
3,776,665 A 12/1973 Dalton
(Continued)

FOREIGN PATENT DOCUMENTS

EP 2333335 A1 6/2011
EP 2634426 A1 * 9/2013 ................ F04B 1/02
(Continued)

OTHER PUBLICATIONS

English Machine Translation of the Description for EP2634426A1 dated Sep. 2013 (Year: 2013).*
(Continued)

*Primary Examiner* — Nathan C Zollinger
(74) *Attorney, Agent, or Firm* — Meunier Carlin & Curfman LLC

(57) ABSTRACT

The present invention relates to a dual-stage pump for a hydraulic system with a housing, a high and low-pressure pump element, a common pressure outlet and a switching valve that is arranged between a tank connection and the low-pressure pump element. The switching valve has a spring element and a piston being movable against a force of the spring element relative to the housing and having a closing member that can be lifted from a valve seat by a control pressure that is tapped on the pressure outlet and applied in a control pressure chamber. On the one hand, the invention is characterized in that the switching valve comprises a tappet that is movable relative to the housing and configured to move the piston and arranged between the control pressure chamber and the piston and has a smaller effective diameter than the piston. On the other hand, the invention is characterized in that the dual-stage pump comprises at least one valve that can be screwed into the housing,
(Continued)

wherein a cutting edge of the valve is sealingly cut into the housing.

14 Claims, 9 Drawing Sheets

(51) Int. Cl.
    *F04B 53/16*     (2006.01)
    *F04B 53/10*     (2006.01)
    *F04B 23/06*     (2006.01)
    *F16K 15/04*     (2006.01)

(52) U.S. Cl.
    CPC .......... *F04B 53/1087* (2013.01); *F04B 53/16* (2013.01); *F04B 53/101* (2013.01); *F16K 15/044* (2013.01)

(56) References Cited

U.S. PATENT DOCUMENTS

| | | | | |
|---|---|---|---|---|
| 4,850,825 A * | 7/1989 | Budecker | .............. | B60T 8/4031 417/538 |
| 4,850,828 A * | 7/1989 | Yonezawa | ................. | F04B 1/02 417/252 |
| 5,063,961 A * | 11/1991 | Brunner | ................. | F16J 15/104 137/454.5 |
| 6,142,445 A * | 11/2000 | Kawaguchi | ......... | F04B 27/1804 251/129.15 |
| 6,196,808 B1 * | 3/2001 | Taguchi | .............. | F04B 27/1804 417/222.2 |
| 7,704,055 B2 * | 4/2010 | Hohmann | ............... | B25B 29/02 417/286 |
| 8,915,722 B1 | 12/2014 | Blume | | |
| 2010/0263363 A1 | 10/2010 | Neumair et al. | | |

FOREIGN PATENT DOCUMENTS

EP            2634426 A1     9/2013
EP            2674626        12/2013

OTHER PUBLICATIONS

Copy of H000439H US Statutory Invention Registration dated Mar. 1988 (Year: 1988).*

German Office Action, dated Sep. 20, 2017, in connection with German Application No. 102017200212.3.

Spanish Examination Report, dated Sep. 12, 2018, in connection with Spanish Application No. ES 201731471.

* cited by examiner

DUAL-STAGE PUMP WITH SWITCHING VALVE

CROSS-REFERENCE TO RELATED APPLICATIONS

This application claims priority to German Application No. 10 2017 200 212.3, filed Jan. 9, 2017, which is incorporated herein by reference in its entirety.

BACKGROUND

The present invention relates to a dual-stage pump for a hydraulic system with a housing, a high-pressure pump element, and a low-pressure pump element, a common pressure outlet and a switching valve that is arranged between a tank connection and the low-pressure pump element and configured as a seated valve.

Such dual-stage pumps are known from the prior art. For example, EP 2 634 426 A1 shows such dual-stage pump with switching valve. The switching valve is arranged in the housing and comprises a spring element and a piston that is movable against the force of the spring element relative to the housing. The piston comprises a closing member that can be lifted from a valve seat by a control pressure that is tapped at the pressure outlet and applied in a control pressure chamber, so that the switching valve opens to the tank.

The switching valve known from EP 2 634 426 A1 has a sleeve that is received in the housing of the dual-stage pump and that has a valve seat to which the conical closing member of the piston abuts due to the force of the spring element. Further, the piston comprises a skirt to the outer circumferential surface of which the spring element in the form of a cup spring pad is arranged. On the one hand the sleeve and in opening direction a spring abutment nut that is screwed on the skirt of the piston serve as a spring abutment. Further, the dual-stage pump comprises a pressure and suction valve that is assigned each to the high-pressure pump element and the low-pressure pump element, wherein both pressure valves lead to a common main channel. The pressure and suction valves are mounted in the housing in an at least partially caulked manner and sealed via O-rings regarding the housing.

As soon as the control pressure in the control chamber exceeds the limit pressure adjusted via the spring element the piston is moved with the closing member and the switching valve is opened. Then, the low-pressure pump element is switched to circulation and only the flow rate supplied by the high-pressure pump element applies to the pressure outlet. In this case also the low-pressure pressure valve is kept closed by the pressure applied to the pressure outlet, so that the circulation of the low-pressure pump element is with low losses.

Thus, with such a dual-stage pump a significantly higher flow rate of hydraulic fluid can be achieved up to a certain maximum limit pressure that can be adjusted via the spring element. As soon as the adjusted limit pressure is applied to the pressure outlet and is directed into the control chamber the circulation valve is opened and the low-pressure pump element is switched with low losses to circulation, as described above. This is particularly useful when a high flow rate is necessary, for example to travel the no-load stroke of a tool of the hydraulic system. The tool may be for example a hydraulically operated hand tool for pressing cable lugs or a hydraulically operated brace.

It is a drawback of the known dual-stage pumps that the maximum limit pressure is at most ca. 100 to 140 bar due to the spring element or the spring force to be overcome to open the switching valve, respectively. A spring element that only enables to open the switching valve at higher limit pressures cannot be used regularly with the known switching valves. However, it is desirable in some applications to provide a high flow rate through both pump elements on the pressure outlet also at a pressure of more than 140 bar. Further, the known dual-stage pumps are costly to produce and thus, expensive.

Thus, it is an object of the present invention to show a dual-stage pump that enables a higher limit pressure. This object is solved by the dual-stage pump according to claim 1. Further, it is an object of the present invention to show a dual-stage pump that is cheaper to produce. This object is solved by the dual-stage pump according to claim 1 and claim 13. Suitable developments are described in the dependent claims.

SUMMARY

The dual-stage pump for a hydraulic system according to the invention distinguishes itself in particular from the well-known dual-stage pumps by the fact that the switching valve comprises a tappet that is movable relative to the housing and configured to move the piston and arranged between the control pressure chamber and the piston, wherein the tappet has a smaller effective diameter than the piston. That is, to open the switching valve the control pressure in the control pressure chamber is not directly applied to the piston, but indirectly via the tappet that is movable relative to the housing. Due to the smaller effective diameter of the tappet the piston can be moved with reduced forces. This means that generally higher limit pressures of more than 140 bar are enabled for the employment of a spring element with the highest possible spring constant despite the reduced space requirement. Hence, spring elements with a lower spring constant can be employed which is why an opening of the switching valve also can only occur at higher pressures that are in particular above 100 to 140 bar. This further allows that the spring element has a simpler structure and thus, is cost-effective. During the closing movement of the piston it in turn displaces the tappet toward the control pressure chamber. Suitably, the ratio of the effective diameter of the tappet to the effective diameter is in a range of 0.1 to 0.85, particularly preferred in a range of 0.2 to 0.5.

It is of advantage if the switching valve comprises a sleeve that is fixedly arranged at or at least partially in the housing, respectively, wherein the sleeve comprises the control pressure chamber and the tappet is moveably arranged at the sleeve. In particular, it is advantageous if the sleeve is pressed flush into the housing. The tapped control pressure is applied to the tappet in the control pressure chamber of the sleeve, so that this moves relative to the sleeve and thus, to the housing toward the piston. Further, by this arrangement it is caused that only the force of the tappet acts on the sleeve, so that only a small force has to be transferred to the housing. This arrangement is cost-effective to produce and allows an easy mounting.

In this connection it is advantageous if a return line pressure chamber is arranged between the sleeve and the piston, wherein the tappet can be displaced from the control pressure chamber toward the return line pressure chamber by the control pressure to open the switching valve. In the return line pressure chamber there applies the return line pressure, so that the closing movement of the piston is damped. So, the wear at the closing member and at the valve seat can be reduced. Here, it is useful if the piston comprises at least one outlet opening to the return line pressure chamber, wherein the outlet opening particularly represents a hydraulic resistance. In this way, during the closing movement of the piston a pressure is generated in the return line pressure chamber, so that the damping of the closing movement of the piston can be specifically adjusted via the number of outlet openings.

Preferably, the tappet comprises an axial end that contacts a mounting hole of the piston to move the piston, wherein the axial end is a rounded or spherical end, respectively. Alternatively, it may be suitable if the tappet comprises a tappet pin and a tappet ball. The tappet ball is arranged in the mounting hole of the piston and the tappet pin comprises an axial end that contacts the tappet ball to move the piston. In particular, the mounting hole is formed as a conical or tapering hole. This has the advantage that lateral forces are reduced due to the round contact surface between the rounded end of the tappet of the tappet ball and the mounting hole. Therefore, the friction forces are reduced which in total results in a lower switching hysteresis. By using a tappet ball the axial end of the tappet pin can be formed flat, so that this results in a cost advantage compared to a one-piece tappet with a rounded end.

Preferably, the piston comprises a spring chamber, wherein the spring element is at least partially arranged in the spring chamber. This enables a compact design of the switching valve and a very good centering of the spring element relative to the piston.

Preferably, the switching valve comprises a spring bushing that has a spring abutment and can be screwed into the housing, wherein the spring element is arranged between the spring abutment and the piston. By screwing out the spring bushing the spring element can be replaced, for example in order to insert a spring element with another spring constant for adjusting another limit pressure.

In this connection it is useful if the spring bushing comprises a female thread, wherein the spring abutment is screwed into the female thread of the spring bushing. Thus, the spring abutment is relatively movable over the spring bushing by screwing and unscrewing, so that the desired bias of the spring element is easy to adjust by a movement of the spring abutment.

Preferably, the spring abutment comprises a tool-receiving socket. The tool-receiving socket can be for example a slot with a hole or also a hexagon socket, so that the bias of the spring element can quickly and easily be adjusted. It is particularly of advantage if a securing element is pressed into the tool-receiving socket. The securing element may be for example a metallic ball. After the desired spring bias has been adjusted and checked, the securing element is pressed into the tool-receiving socket, so that a wrong adjustment of the spring abutment and therefore, the adjusted bias of the spring element is excluded. In this way, a particularly high operational reliability and an exact opening of the switching valve at the desired limit pressure is enabled.

Preferably, the spring bushing comprises at least one flow connection to the tank. When opening the switching valve the hydraulic fluid of the low-pressure pump element that flows in via an inlet can be led away via the spring bushing.

Preferably, the valve seat for the closing member of the piston is arranged at the housing. Therefore, no bushing or the like is necessary to provide the valve seat for the closing element of the piston. Thus, the dual-stage pump generally is more cost-effective to produce and easier to mount.

Preferably, the dual-stage pump comprises a high-pressure pressure valve assigned to the high-pressure pump element and a high-pressure suction valve assigned to the high-pressure pump element, and the dual-stage pump comprises a low-pressure pressure valve assigned to the low-pressure pump element and a low-pressure suction valve assigned to the low-pressure pump element. The high-pressure pressure valve and/or the high-pressure suction valve and/or the low-pressure pressure valve and/or the low-pressure suction valve are suitably screwed into the housing, wherein a cutting edge of the corresponding valve sealingly cuts or is cut into the housing, respectively.

Moreover, the problem is also solved by the fact that the dual-stage pump comprises a high-pressure pressure valve assigned to the high-pressure pump element and a high-pressure suction valve assigned to the high-pressure pump element, and that the dual-stage pump comprises a low-pressure pressure valve assigned to the low-pressure pump element and a low-pressure suction valve assigned to the low-pressure pump element. The dual-stage pump according to the invention distinguishes itself from the dual-stage pumps known from the prior art by the fact that the high-pressure pressure valve and/or the high-pressure suction valve and/or the low-pressure pressure valve and/or the low-pressure suction valve are screwed into the housing, wherein a cutting edge of the corresponding valve sealingly cuts or is cut into the housing, respectively.

With this arrangement a quick and uncomplicated sealing of the corresponding valves with respect to the housing can be achieved. Further, in this way also the mounting of the dual-stage pump is made easier, since the corresponding valves are screwed into the housing with the required momentum, wherein at the same time the sealing is generated by cutting in of the cutting edge. Moreover, the cutting edge needs a significantly smaller installation space than conventional sealing elements. Also, the cutting edge results in a smaller, but well-defined sealing diameter compared to conventional sealing elements, for example compared to a soft iron sealing ring.

Preferably, the dual-stage pump in addition to the cutting edge cut into the housing does not comprise any further sealing element to seal the corresponding valve or valves with respect to the housing.

Thus, the sealing of the valves with respect to the housing is only established by the cut in cutting edge, so that no further O-rings or the like are required. On the one hand this saves costs for additional sealing elements. On the other hand, fabrication is simplified, since no grooves or like structures for receiving the sealing element must be provided on the housing or on the corresponding valve.

Preferably, the high-pressure pressure valve and/or the low-pressure pressure valve comprise a closing member, wherein the housing comprises the corresponding pressure valve seat or the corresponding pressure valve seats. Therefore, no bushing or the like is necessary to provide the pressure valve seat for a closing element of the pressure valve. Thus, the dual-stage pump generally is more cost-effective to produce. It is particularly of advantage if the high-pressure pressure valve and/or the low-pressure pressure valve have a ball as the closing member.

BRIEF DESCRIPTION OF THE DRAWINGS

In the following the invention is explained in detail with the help of the examples shown in the drawings. Here.

DETAILED DESCRIPTION

Figure 1:
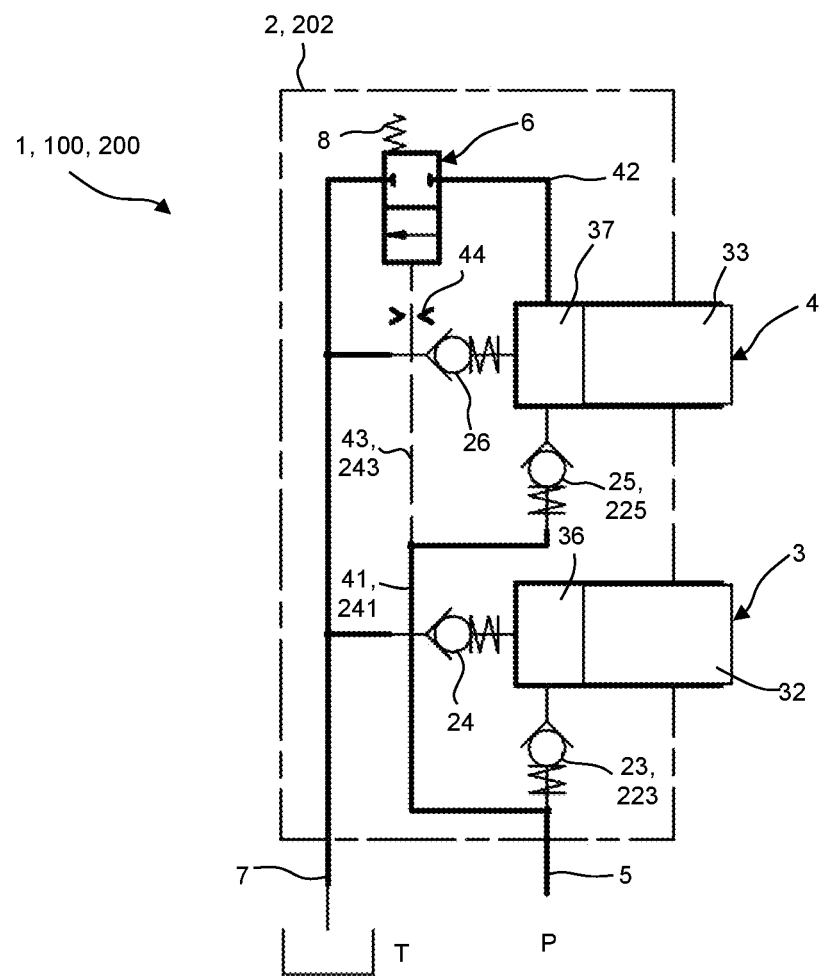
FIG. 1 schematically shows a dual-stage pump according to the invention in the form of a hydraulic diagram.

In FIG. 1 a hydraulic diagram of the dual-stage pump 1, 100, 200 according to the invention is illustrated that is first explained in the following. The dual-stage pump 1, 100, 200 has a block-like formed housing 2, 202 in which a high-pressure pump element 3 and a low-pressure pump element 4 are arranged, wherein the high-pressure pump element 3 provides a lower flow rate of hydraulic fluid than the low-pressure pump element 4. The high-pressure pump element 3 and the low-pressure pump element 4 convey the hydraulic fluid via a common housing channel 41, 241 to a common pressure outlet 5. Further, the dual-stage pump 1, 100, 200 comprises a tank connection 7. The dual-stage pump 1, 100, 200 is connected to a hydraulic system (not shown), wherein the pressure outlet 5 forms the P connection of the hydraulic system and the tank connection 7 is connected to the tank T of the hydraulic system.

The high-pressure pump element 3 comprises a high-pressure pressure valve 23, 223, a high-pressure suction valve 24, and a piston 32 that is movable in a delivery chamber 36. The low-pressure pump element 4 is correspondingly structured and comprises a low-pressure pressure valve 25, 225, a low-pressure suction valve 26, and a piston 33 that is movable in a delivery chamber 37. The pump elements 3, 4 are described in more detail below.

In the housing 2, 202 of the dual-stage pump 1, 100, 200 there is further arranged a switching valve 6 that is formed as a seated valve and connected to the delivery chamber 37 of the low-pressure pump element 4 via a branch 42. Further, a control pressure line 43, 243 branches off from the common housing channel 41, 241 downstream of the pressure valves 23, 25, 223, 225, so that the switching valve 6 can be loaded with the pressure applied to the pressure outlet 5 as control pressure via the control pressure line 43, 243. As soon as the control pressure exceeds the force of the spring element 8 acting as a biasing spring—and therefore a limit pressure adjusted by the spring element 8—the switching valve 6 is controlled to open and opened to the tank T. As illustrated, a hydraulic resistance 44, for example an orifice, can be arranged in the control pressure line 43, 243.

When the dual-stage pump 1, 100, 200 starts operation both pistons 32, 33 perform a suction movement. Here, hydraulic fluid is sucked from the tank T into the delivery chambers 36, 37 via the suction valves 24, 26. During the return movement of the pistons 32, 33 the hydraulic fluid present in the delivery chambers 36, 37 is compressed and conveyed into the common housing channel 41, 241 and further to the pressure outlet 5 via the pressure valves 23, 25, 223, 225. Here, the lower flow rate of the high-pressure pump element 3 and the higher flow rate of the low-pressure pump element 4 add up, wherein the switching valve 6 is in the closed position. The pressure applied to the pressure outlet 5 is signalized via the control pressure line 43, 243 to the switching valve 6 which opens when the limit pressure adjusted via the spring element 8 is reached or exceeded, respectively. The low-pressure pressure valve 25 remains closed after the limit pressure has been reached due to the high pressure in the common housing channel 41, 241, so that the flow rate of the low-pressure pump element 4 is directed into the tank T via the branch 42 and the opened switching valve 6 with low losses. Thus, the low-pressure pump element 4 is switched to a continuous operation with low losses.

Figure 2:
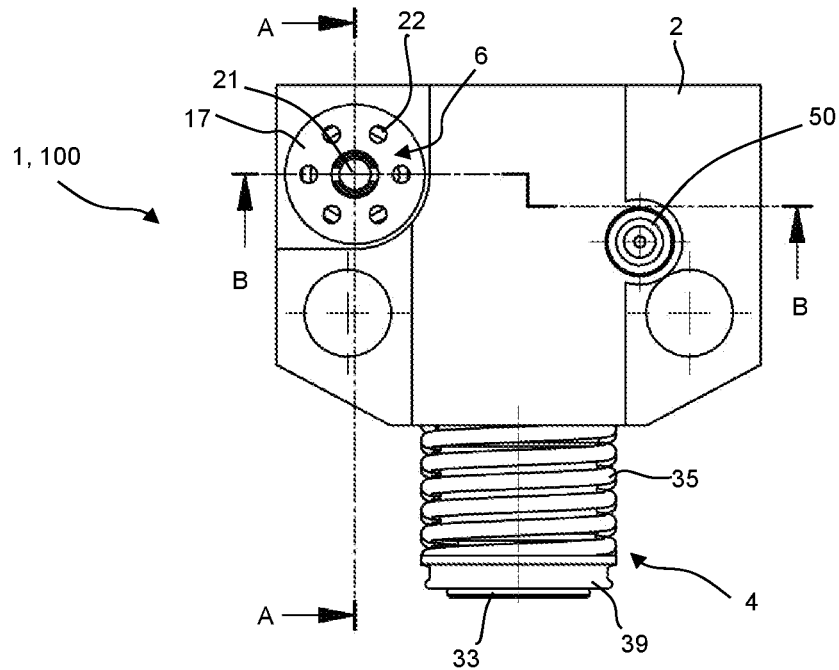
FIG. 2 schematically shows a plan view of the dual-stage pump according to the invention.
Figure 3A:
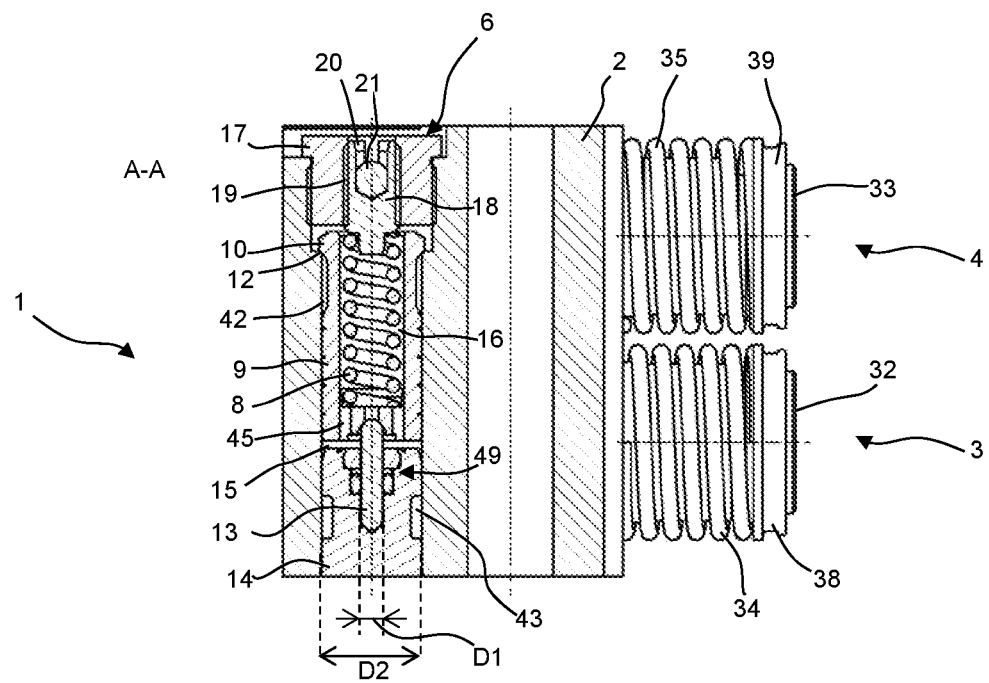
FIG. 3A schematically shows a section through the dual-stage pump according to a first example along the cutting line A-A shown in FIG. 2, with the switching valve in the closed position.
Figure 3B:
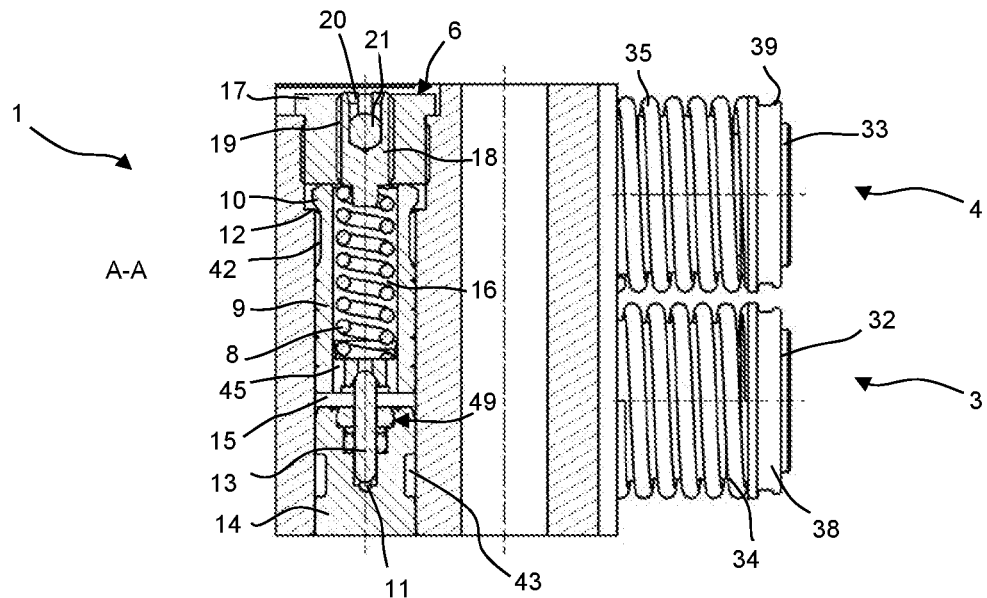
FIG. 3B schematically shows a section through the dual-stage pump according to the first example along the cutting line A-A shown in FIG. 2, with the switching valve in the opened position.
Figure 4:
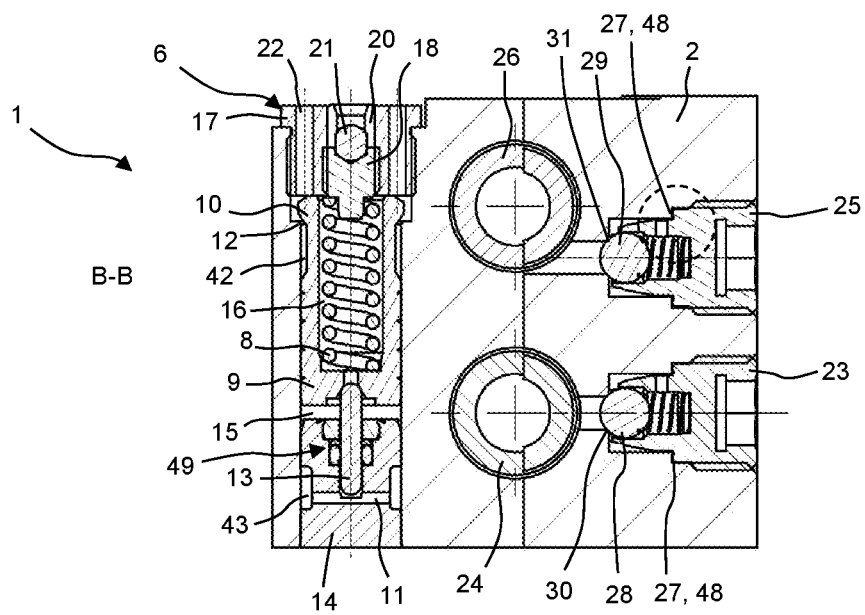
FIG. 4 schematically shows a section through the dual-stage pump according to the first example along the cutting line B-B shown in FIG. 2, with the switching valve in the opened position.

In FIGS. 3A, 3B, and 4 sections of a first embodiment of the dual-stage pump 1 along lines A-A illustrated in FIG. 2 (FIG. 3A and FIG. 3B) and B-B (FIG. 4) are shown with the help of which the switching valve 6 is explained in more detail. Here, FIG. 3A shows the switching valve 6 in a closed position and FIG. 3B shows the switching valve 6 in an opened position. The switching valve 6 comprises the spring element 8, a piston 9 that is movable relative to the housing 2, and a closing member 10 arranged at the piston 9. The closing member 10 in this example is integrally formed with the piston 9 as a surrounding conical collar. As illustrated in FIG. 3A, the closing member 10 in the closed position is attached to a valve seat 12 which is directly arranged at the housing 2. In the closed position of the closing member 10 illustrated in FIG. 3A no hydraulic fluid can flow to the tank T via the branch 42.

In this example the spring element 8 is a coil spring that is accommodated in a spring chamber 16 of the piston 9 and on one side supports itself against the front of the spring chamber 16 and on the other side against a spring abutment 18. Here, the spring abutment 18 is formed as a wormscrew with a central axially protruding neck for centering the spring element 8. The spring abutment 18 is screwed into a female thread 19 of a spring bushing 17, wherein the spring bushing 17 is screwed into a respective hole of the housing 2.

To adjust the bias of the spring element 8 the spring abutment 18 is screwed into or unscrewed from the spring bushing 17. For that, the spring abutment 18 comprises a tool-receiving socket 20, for example a slot with a hole or a hexagon socket. When the spring abutment 18 is further screwed into the spring bushing 17 toward the piston 9 the spring element 8 is compressed, so that the bias is increased. In order to prevent an undesired wrong adjustment of the adjusted bias of the spring element 8 a securing element 21 is inserted into the tool-receiving socket 20. In this example, the securing element 21 is a ball that is pressed into the tool-receiving socket 20.

As illustrated in FIG. 2 and FIG. 4 the spring bushing 17 comprises several flow connections 22 through which the hydraulic fluid can flow from the branch 42 to the tank T when the switching valve 6 is opened. This state, in which the closing member 10 is lifted from the valve seat 12, is illustrated in FIG. 3B. The hydraulic fluid flows from the delivery chamber 37 of the low-pressure pump element 4 through the branch 42 toward the spring bushing 17. Here, the hydraulic fluid can pass through the spring bushing 17 to the tank T through the flow connections 22.

Moreover, the switching valve 6 comprises a sleeve 14 that is pressed into the housing 2. As shown in FIGS. 3A, 3B, and 4 the sleeve 14 is flush pressed into the hole of the housing 2 that accommodates the switching valve 6. Control pressure line 43 that is provided in the housing 2 as an oblique hole leads to a radially surrounding groove of the sleeve 14, wherein inside the sleeve 14 a control pressure chamber 11 is formed that is connected to the groove. In this example, the control pressure chamber 11 is a hole penetrating the sleeve 14 in a radial direction, so that no axial forces occur. Further, the switching valve 6 comprises a tappet 13 that is arranged axially moveably relative to the sleeve 14. In detail, the tappet 13 is arranged such that its first axial end is directed toward the piston 9, wherein its second axial end leads to the control pressure chamber 11. The tappet 13 is sealed via a sealing arrangement 49. The piston 9 comprises a conical mounting hole in which the second axial end of the tappet 13 is accommodated.

As illustrated in FIG. 3A the piston 9 does not contact the sleeve 14. Rather, a return line pressure chamber 15 is provided between the piston 9 and the sleeve 14 through which the tappet 13 extends. By the sealing arrangement 49 it is prevented that leakage oil flows between the control pressure chamber 11 and the return line pressure chamber 15. The piston 9 correspondingly comprises outlet openings 45 that connect the spring chamber 16 to the return line pressure chamber 15. As exemplified in FIG. 3A, the effective diameter D1 of the tappet 13 is smaller than the effective diameter D2 of the piston 9. In this example the effective diameter D1 is approximately 0.25×D2.

When the dual-stage pump 1 starts operation there is immediately tapped a control pressure via the control pressure line 43 and directed into the control pressure chamber 11. Here, the tappet 13 is pressurized, so that it makes a small movement in the axial direction until the first axial end of the tappet 13 is accommodated in the mounting hole of the piston 9. As is illustrated, the first axial end of the tappet 13 is formed rounded, so that the lateral forces between the tappet 13 and the piston 9 are low. This results in low friction forces and therefore, a low switching hysteresis. As soon as the control pressure in the control pressure chamber 11 has reached or exceeded, respectively, the limit pressure adjusted via the spring element 8, the tappet 13 axially displaces the piston 9 toward the spring bushing 17 and thus, compresses the spring element 8. Further, during the axial movement of the piston 9 the closing member 10 is lifted from the valve seat 12 and the hydraulic fluid can flow to the tank T. Therefore, there is not directly applied a control pressure to the piston 9, but indirectly via the tappet 13.

Due to the smaller effective diameter D1 of the tappet 13 over the effective diameter D2 of the piston 9 there results a lower necessary force for the displacement of the tappet 13 and therefore the piston 9. Thus, a spring element 8 with a smaller spring constant than with the known dual-stage pumps can be employed to achieve the same limit pressures. Further, thus also spring elements with larger spring constants and less required installation space can be employed, so that generally a limit pressure of more than 140 bar can be adjusted. Moreover, also significantly more cost-effective spring elements 8 can be used.

As soon as the control pressure in the control pressure chamber 11 again decreases below the adjusted limit pressure the spring element 8 displaces the piston 9 toward the sleeve 14 until the closing member 10 rests on the valve seat 12. Here, the hydraulic fluid in the return chamber 15 is forced away by the piston 9 by the hydraulic fluid flowing through the outlet openings 45 into the spring chamber 16 during the closing movement of the piston 9. In this way, the closing movement of the piston 9 generally is damped, so that the closing member 10 does not hit the valve seat 12 with a jerk. Here, the piston 9 again displaces the tappet 13 toward the control pressure chamber 11, since the control pressure in the control pressure chamber 11 also has fallen below the adjusted limit pressure.

In the following the pump elements 3, 4 are now described in detail with particular reference to FIGS. 4 and 8 to 10. As is illustrated, the pistons 32, 33 extend laterally from the housing 2. The pistons 32, 33 of the pump elements 3, 4 may be driven for example via a common eccentric shaft (not shown). Of course, it is also conceivable that each of the two pistons 32, 33 is driven via a separate shaft. Further, the pistons 32, 33 also do not have to be arranged in parallel and acting in the same direction, as shown.

Figure 10:
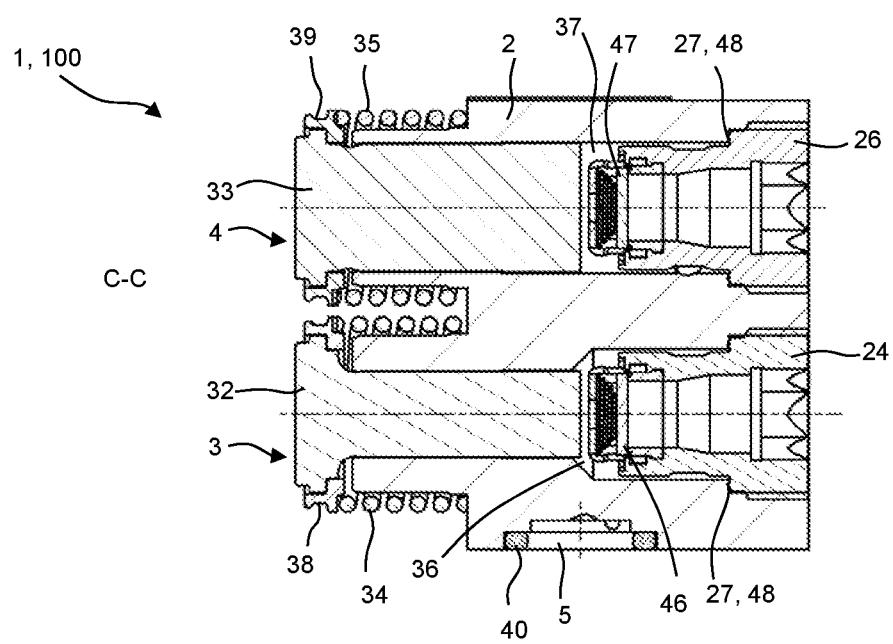
FIG. 10 schematically shows a section along the cutting line C-C shown in FIG. 9.

In this example, the pistons 32, 33, as illustrated in FIG. 10, have the same effective length with the piston 32 of the high-pressure pump element 3 having a smaller diameter than the piston 33 of the low-pressure pump element 4, so that there results a generally smaller flow rate at a higher pressure. Both pump elements 3, 4 each have a spring assembly 34, 35 in the form of coil springs that support themselves on the one hand at the housing 2 and on the other hand at a spring abutment 38, 39 that is arranged at the respective piston 32, 33.

When the dual-stage pump 1 starts operation the pistons 32, 33 at first perform a suction movement, i.e. the pistons 32, 33 move in a direction away from the corresponding suction valves 24, 26 due to the spring force of the spring assemblies 34, 35. Here, hydraulic fluid is sucked into the delivery chambers 36, 37 via the suction valves 24, 26. Subsequently, the pistons 32, 33 perform a pressure movement, i.e. the pistons 32, 33 move toward the suction valves 24, 26. Here, the hydraulic fluid is directed out of the delivery chambers 36, 37 to the pressure valves 23, 25.

Figure 6:
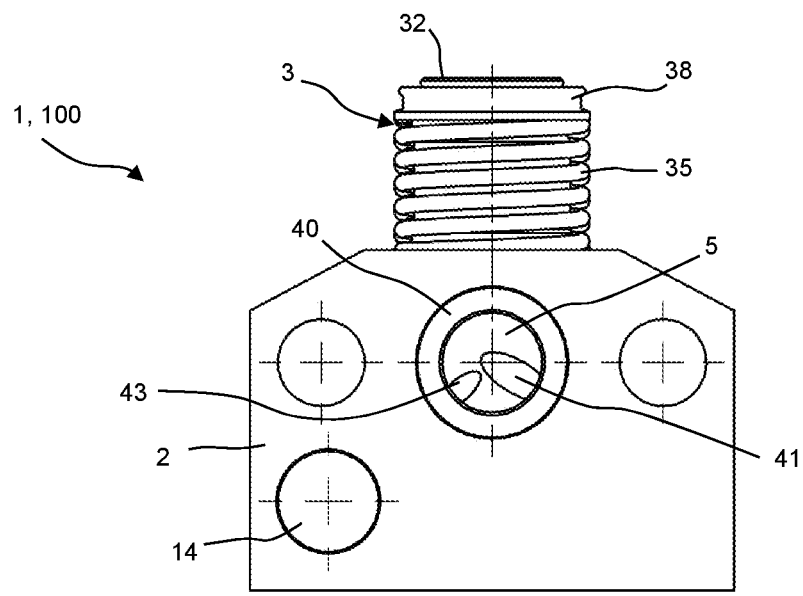
FIGS. 6 to 9 schematically show various views of the dual-stage pump according to the invention.
Figure 7:
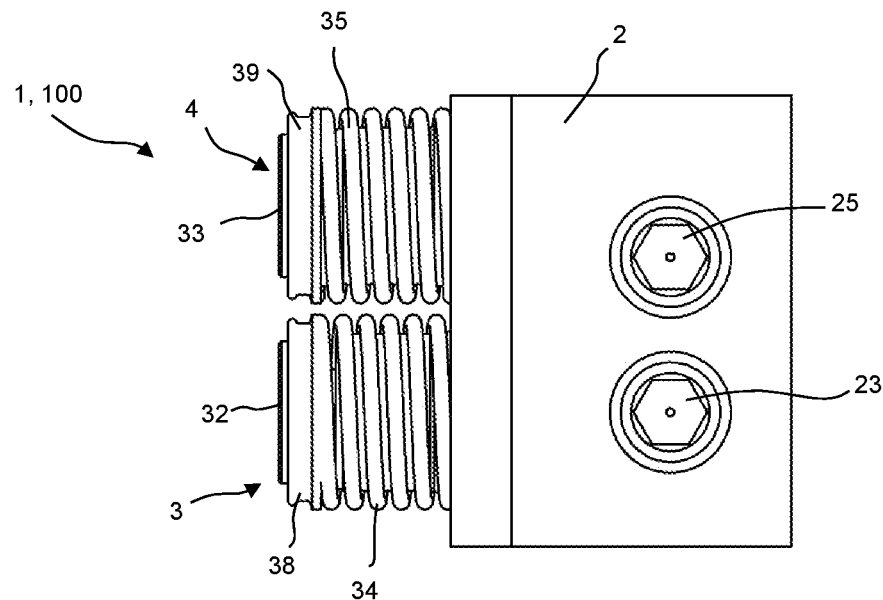
Figure 8:
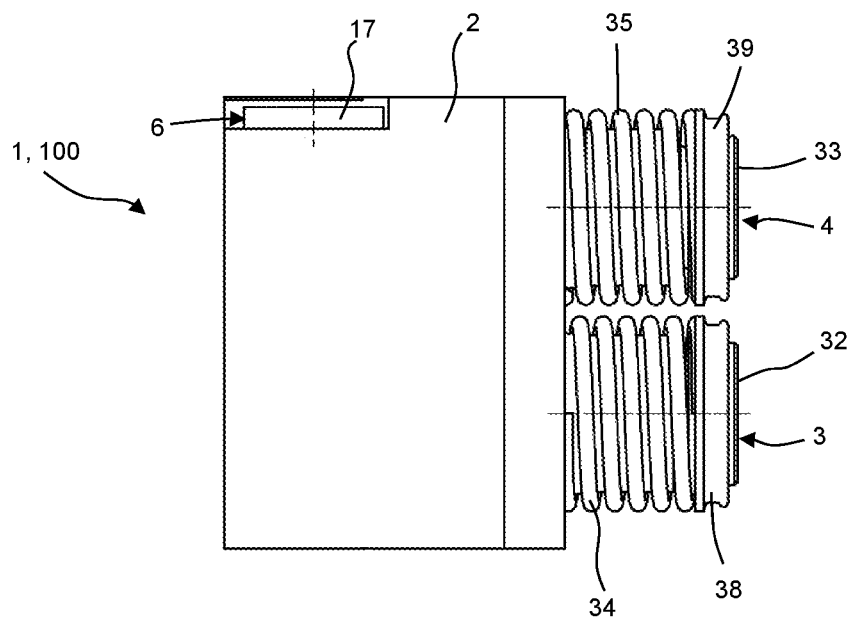
Figure 9:
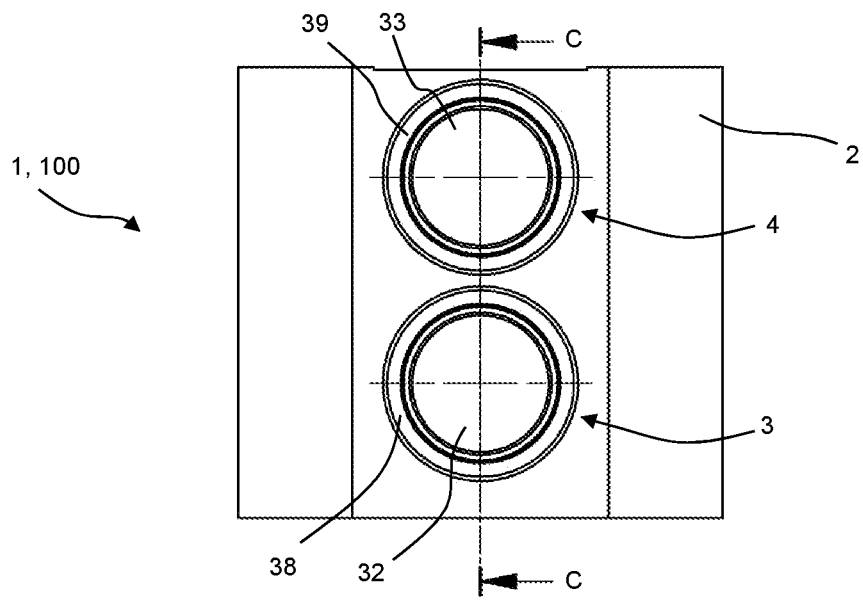

The high-pressure pressure valve 23 and the low-pressure pressure valve 25 are constructed in the same way and comprise spring-loaded closing members 28, 29 in the form balls. The respective pressure valve seat 30, 31 is provided at the housing 2. By the hydraulic fluid flowing out of the delivery chambers 36, 37 the closing members 28, 29 are displaced against the spring force and the hydraulic fluid flows into the common housing channel 41 and as a result to the pressure outlet 5. At the pressure outlet 5 a sealing element 40 can be provided, for example an O-ring. The pressure valves 23, 25 are connected via a straight hole that is closed with a plug 50 (cf. FIG. 2) and together with a further oblique hole as apparent from in FIG. 6 represents the common housing channel 41.

The high-pressure suction valve 24 and the low-pressure suction valve 26 are constructed in the same way and each comprises a spring-loaded slice 46, 47 as the closing member. Further, the suction valves 24, 26 are screwed into a corresponding hole of the housing 2, so that the axial ends of the suction valves 24, 26 protruding into the housing lead to the respective delivery chamber 36, 37.

Figure 5:
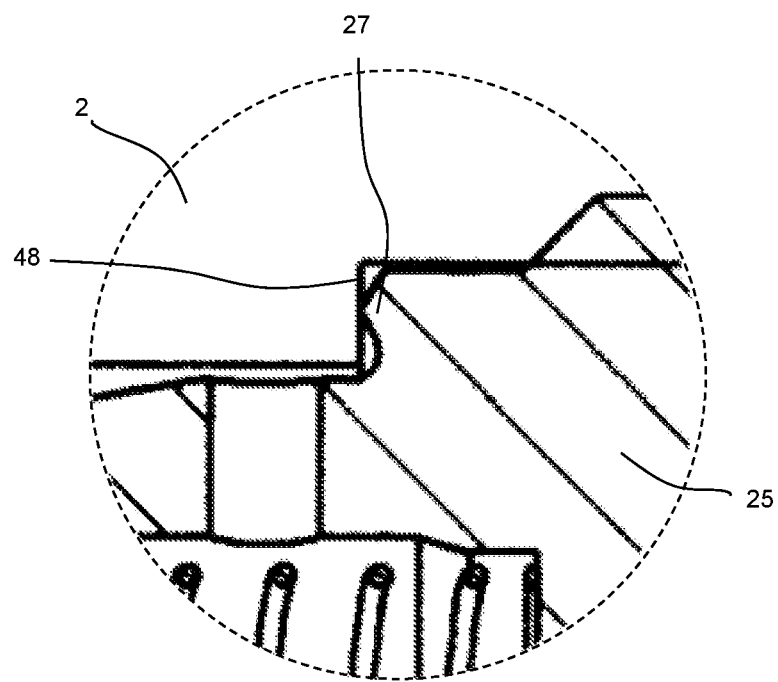
FIG. 5 schematically shows an enlarged view of the dotted section according to FIG. 4.

Further, the high-pressure pressure valve 23, the high-pressure suction valve 24, the low-pressure pressure valve 25 as well as the low-pressure suction valve 26 each have a cutting edge 27 that is exemplified in the following in detail with respect to the section of the low-pressure pressure valve 25 illustrated in FIG. 5, cf. for that also the dotted circle in FIG. 4.

The cutting edge 27 is a structure that pointedly protrudes in the circumferential direction of the valve 25 in the axial direction. When screwing the valve 25 into the respective hole of the housing 2 the cutting edge 27 contacts a sealing shoulder 48 of the housing 2. The cutting edge 27 plastically cuts into the sealing shoulder 48 until the valve 25 has been tightened with the required momentum. Because the cutting edge 27 cuts into the sealing shoulder 48 of the housing 2 the valve 25 is sealed with respect to the housing 2 such that no further sealing elements are necessary between the valve 25 and the housing 2.

In the following a second embodiment of a dual-stage pump 100 and a third embodiment of a dual-stage pump 200 are explained in detail, wherein due to the broad matches with the first example only the corresponding differences are discussed. Further, some reference symbols are not indicated in FIGS. 11A to 15 for reasons of clarity.

Figure 11A:
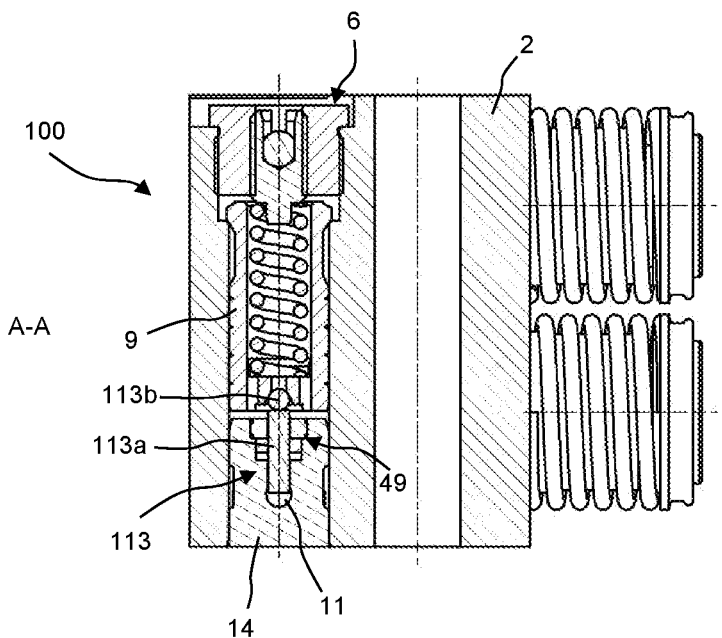
FIG. 11A schematically shows a section through the dual-stage pump according to a second example along the cutting line A-A shown in FIG. 2, with the switching valve in a closed position.
Figure 11B:
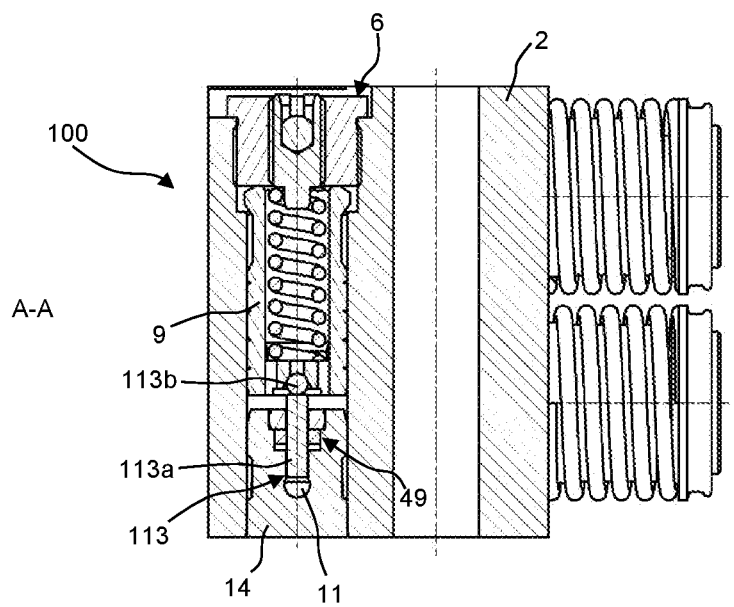
FIG. 11B schematically shows a section through the dual-stage pump according to the second example along the cutting line A-A shown in FIG. 2, with the switching valve in an opened position.
Figure 12:
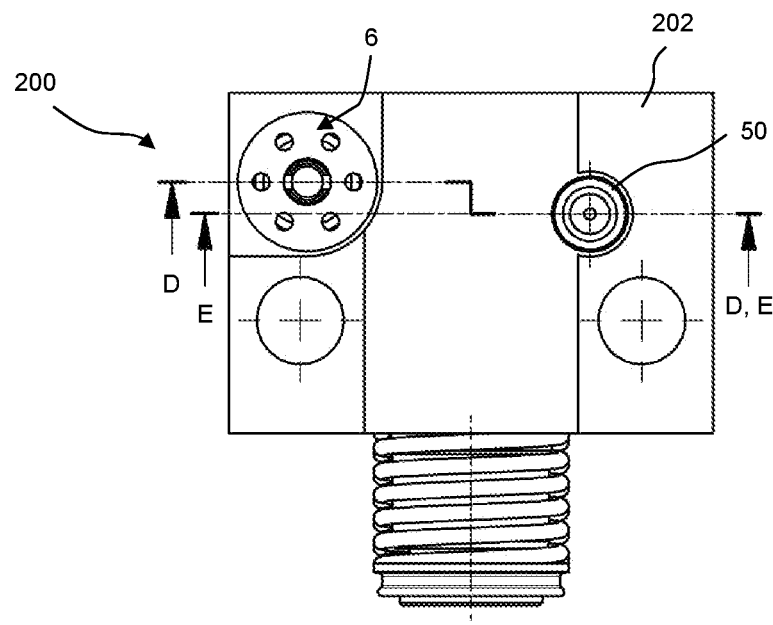
FIG. 12 schematically shows a plan view of the dual-stage pump according to the invention according to a third example.
Figure 13:
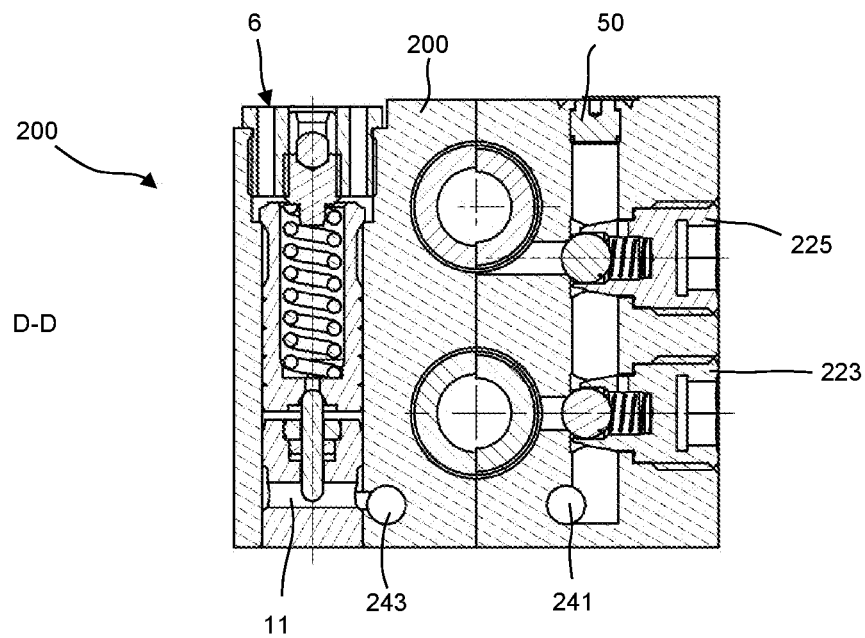
FIG. 13 schematically shows a section along the cutting line D-D shown in FIG. 12, with the switching valve in a closed position.
Figure 14:
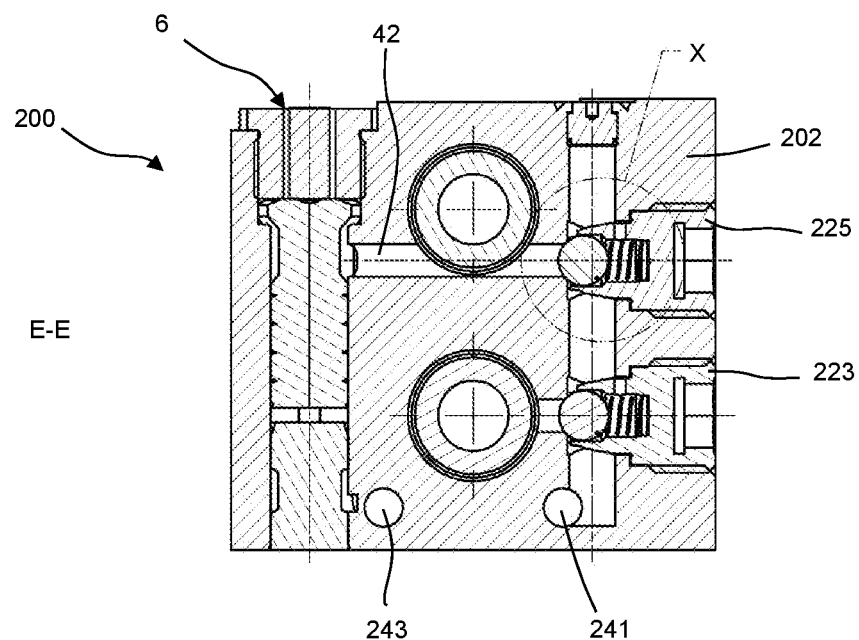
FIG. 14 schematically shows a section along the cutting line E-E shown in FIG. 12, with the switching valve in an opened position.
Figure 15:
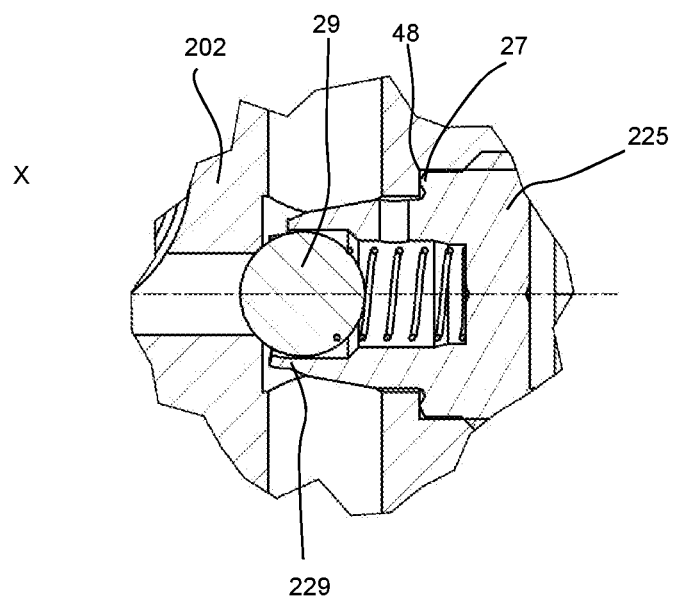
FIG. 15 schematically shows an enlarged detailed view of detail X according to FIG. 14.

In FIGS. 11A and 11B sections of the dual-stage pump 100 according to the invention are shown in accordance with the second example along lines A-A illustrated in FIG. 2. In FIG. 11A the switching valve 6 is illustrated in the closed position and in FIG. 11B the switching valve 6 is illustrated in the opened position.

In the following, the alternative design of a tappet 113 is explained in detail. Tappet 113 in this example consists of a tappet pin 113a and a tappet ball 113b. The first axial end of the tappet pin 113a is formed flat with the tappet ball 113b being arranged in the mounting hole of the piston 9. This two-piece configuration of the tappet 113 has the advantage that the tappet pin 113a with the flat first axial end and the tappet ball 113b represent suitable standard components. Nevertheless, due to the tappet ball 113b the lateral and friction forces between the piston 9 and its mounting hole and the tappet 113 are low, so that also a low switching hysteresis is possible. Further, also the second axial end of the tappet pin 113a can be formed flat, as illustrated.

In FIGS. 12 to 15 a third example of a dual-stage pump 200 according to the invention is illustrated. While in the figures a tappet 13 with a rounded first axial end is illustrated, of course there can also be used the tappet 113 according to FIGS. 11A and 11B.

The dual-stage pump 200 according to the third example on the one hand differs by the design of the common housing channel 241 and the control pressure line 243 in the housing 202. In this example, as illustrated, these are formed as straight holes that are each closed by closing plugs (not shown) at the housing 202. The straight holes have production-oriented advantages compared to the oblique holes.

Further, the dual-stage pump 200 also differs by the pressure valves 223, 225. In section X illustrated in FIG. 15 (cf. FIG. 14) it is apparent that the low-pressure pressure valve 225 on the side of the closing member 29 comprises a partially surrounding collar 229. Said collar 229 is impressed in the radial direction 229, so that the closing member 29 is held in position. However, the hydraulic fluid can flow freely, since the collar 229 is formed only partially surrounding. Accordingly, the low-pressure pressure valve 225 can be inserted as a pre-mounted unit into the respective hole of the housing 202. The high-pressure pressure valve 223 is formed identically, as is apparent from FIG. 14. Of course, such pressure valves can also be used in the first embodiment.

LIST OF REFERENCE SYMBOLS 1, 100, 200 dual-stage pump
2, 202 housing
3 high-pressure pump element
4 low-pressure pump element
5 pressure outlet
6 switching valve
7 tank connection
8 spring element
9 piston
10 closing member
11 control pressure chamber
12 valve seat
13, 113 tappet
14 sleeve
15 return line pressure chamber
16 spring chamber
17 spring bushing
18 spring abutment
19 female thread
20 tool-receiving socket
21 securing element
22 flow connection
23, 223 high-pressure pressure valve
24 high-pressure suction valve
25, 225 low-pressure pressure valve
26 low-pressure suction valve
27 cutting edge
28 closing element of the high-pressure pressure valve
29 closing element of the low-pressure pressure valve
30 high-pressure pressure valve seat
31 low-pressure pressure valve seat
32 piston of the high-pressure pump element
33 piston of the low-pressure pump element
34 spring assembly of the high-pressure pump element
35 spring assembly of the low-pressure pump element
36 delivery chamber of the high-pressure pump element
37 delivery chamber of the low-pressure pump element
38 spring abutment of the high-pressure pump element
39 spring abutment of the low-pressure pump element
40 sealing element
41, 241 housing channel
42 branch to the switching valve
43, 243 control pressure line to the switching valve
44 hydraulic resistance
45 outlet opening
46 slice of the high-pressure suction valve
47 slice of the low-pressure suction valve
48 sealing shoulder
49 sealing arrangement
50 plug
113a tappet pin
113b tappet ball
229 collar
D1 effective diameter of the tappet
D2 effective diameter of the piston

The invention claimed is:

1. A dual-stage pump for a hydraulic system comprising a housing, a high-pressure pump element, and a low-pressure pump element, a common pressure outlet and a switching valve that is arranged between a tank connection and the low-pressure pump element and configured as a seated valve,
wherein the switching valve is arranged in the housing and comprises a spring element and a piston that is movable against a force of the spring element relative to the housing,
wherein the piston comprises a closing member that can be lifted from a valve seat by a control pressure that is tapped at the pressure outlet and applied into a control pressure chamber so that the switching valve opens to a tank,
wherein the switching valve comprises a tappet that is separate and independently movable from the piston, wherein the tappet is movable relative to the housing and configured to move the piston and is arranged between the control pressure chamber and the piston, wherein the tappet has a smaller effective diameter than the piston.

2. The dual-stage pump according to claim 1, wherein the switching valve comprises a sleeve fixedly arranged at the housing, wherein the sleeve comprises the control pressure chamber and the tappet is movably arranged at the sleeve.

3. The dual-stage pump according to claim 2, wherein a return line pressure chamber is arranged between the sleeve and the piston, wherein the tappet can be displaced from the control pressure chamber toward the return line pressure chamber by the control pressure to open the switching valve.

4. The dual-stage pump according to claim 1, wherein the tappet comprises an axial end that contacts a mounting hole of the piston to move the piston, wherein the axial end is a rounded end.

5. The dual-stage pump according to claim 1, wherein the tappet comprises a tappet pin and a tappet ball, wherein the tappet ball is accommodated in a mounting hole of the piston and wherein the tappet pin comprises an axial end that contacts the tappet ball to move the piston.

6. The dual-stage pump according to claim 1, wherein the piston comprises a spring chamber, wherein the spring element is at least partially arranged in the spring chamber.

7. The dual-stage pump according to claim 1, wherein the switching valve comprises a spring bushing that has a spring abutment and can be screwed into the housing, wherein the spring element is arranged between the spring abutment and the piston.

8. The dual-stage pump according to claim 7, wherein the spring bushing comprises a female thread, wherein the spring abutment is screwed into the female thread of the spring bushing.

9. The dual-stage pump according to claim 7, wherein the spring abutment comprises a tool-receiving socket, wherein a securing element is pressed into the tool-receiving socket.

10. The dual-stage pump according to claim 7, wherein the spring bushing comprises at least one flow connection to the tank.

11. The dual-stage pump according to claim 1, wherein the valve seat for the closing member of the piston is arranged at the housing.

12. The dual-stage pump according to claim 1, wherein the dual-stage pump comprises a high-pressure pressure valve assigned to the high-pressure pump element and a high-pressure suction valve assigned to the high-pressure pump element, and that the dual-stage pump comprises a low-pressure pressure valve assigned to the low-pressure pump element and a low-pressure suction valve assigned to the low-pressure pump element,
wherein the high-pressure pressure valve and/or the high-pressure suction valve and/or the low-pressure pressure valve and/or the low-pressure suction valve are screwed into the housing, wherein a cutting edge of the corresponding valve is sealingly cut into the housing.

13. The dual-stage pump according to claim 12, wherein the dual-stage pump comprises no separately formed sealing element to seal the corresponding valve with respect to the housing.

14. The dual-stage pump according to claim 12, wherein the high-pressure pressure valve and/or the low-pressure pressure valve comprise a closing member and the housing comprises corresponding pressure valve seats.

* * * * *